Dec. 4, 1962 G. W. HAMMAR 3,067,330
GUN SIGHT

Filed Dec. 13, 1957 2 Sheets-Sheet 1

Gustaf W. Hammar (Deceased)
Louise B. Hammar (Executrix)
INVENTORS

BY
ATTORNEYS

Dec. 4, 1962   G. W. HAMMAR   3,067,330
GUN SIGHT
Filed Dec. 13, 1957   2 Sheets-Sheet 2

Gustaf W. Hammar (Deceased)
Louise B. Hammar (Executrix)
INVENTORS

BY
ATTORNEYS

United States Patent Office 3,067,330
Patented Dec. 4, 1962

3,067,330
GUN SIGHT
Gustaf W. Hammar, deceased, late of Rochester, N.Y., by Louise B. Hammar, executrix, Rochester, N.Y., assignor, by mesne assignments, to the United States of America as represented by the Secretary of the Navy
Filed Dec. 13, 1957, Ser. No. 702,736
1 Claim. (Cl. 250—83.3)

The present invention relates to a gun sight and more particularly to an infrared energy detecting device for night sighting to be used in combination with a sighting telescope and having a unified presentation.

The gun sight of the present invention utilizes both an infrared scanner and a sighting telescope in order to take advantage of opportunities for visual and/or infrared sighting. The infrared scanner comprises broadly an infrared energy sensitive detecting device and means for cyclically scanning a predetermined field and focusing the infrared energy from a target within the field onto the detecting device. The signals produced by the detecting device in response to the presence of infrared energy thereon, are amplified and applied to a visible light source to energize the same. Light from the source is focused into the image plane of a telescope and is viewed through the presenting eyepiece of the telescope either simultaneously with the field of the telescope or by itself, thus providing a visual indication of the presence of a target in the predetermined field. According to the present invention, the visual light source is spaced from and rotated about an axis in synchronism with the movement of the scanning means. The infrared detecting device is comprised of a number of distinct elements and the signals from each element are amplified and applied to the visible light source so that optical alignment of the detecting device and the target is indicated by a pattern of lights seen in the presenting eyepiece of the telescope which pattern is comprised of a number of visible signals equal in number and in arrangement to the number and arrangement of elements making up the detecting device.

The primary object of the present invention is, therefore, to provide an infrared detecting device to be used in combination with a sighting telescope with a unified presentation so as to take advantage of opportunities for visual and/or infrared sighting.

Another object of the present invention is to provide in combination with a telescope having a presenting eyepiece, an infrared detecting apparatus comprising a plurality of distinct infrared energy sensitive detecting elements located in a given plane, means for optically scanning a predetermined field and for focusing the infrared energy from a target within that field onto the detecting elements, and means for amplifying and applying the signals produced by each of the detecting elements in response to the presence of infrared energy to a visible light source to energize the same, whereby the visible light signals indicating the presence of the target may be seen through the presenting eyepiece of the telescope either separately or superimposed on the field of the telescope.

Other objects and advantages of the present invention will become readily apparent to those skilled in the art from the following description with reference to the drawings in which like characters denote like parts and wherein:

FIG. 3 is a schematic wiring diagram illustrating the system by which the signals from the infrared detecting device are amplified and applied to the visible light source; and FIG. 4 represents the presenting eyepiece of the telescope and illustrating the visible light signals produced by the rotating visible light source in accordance with the present invention.

Figure 1:
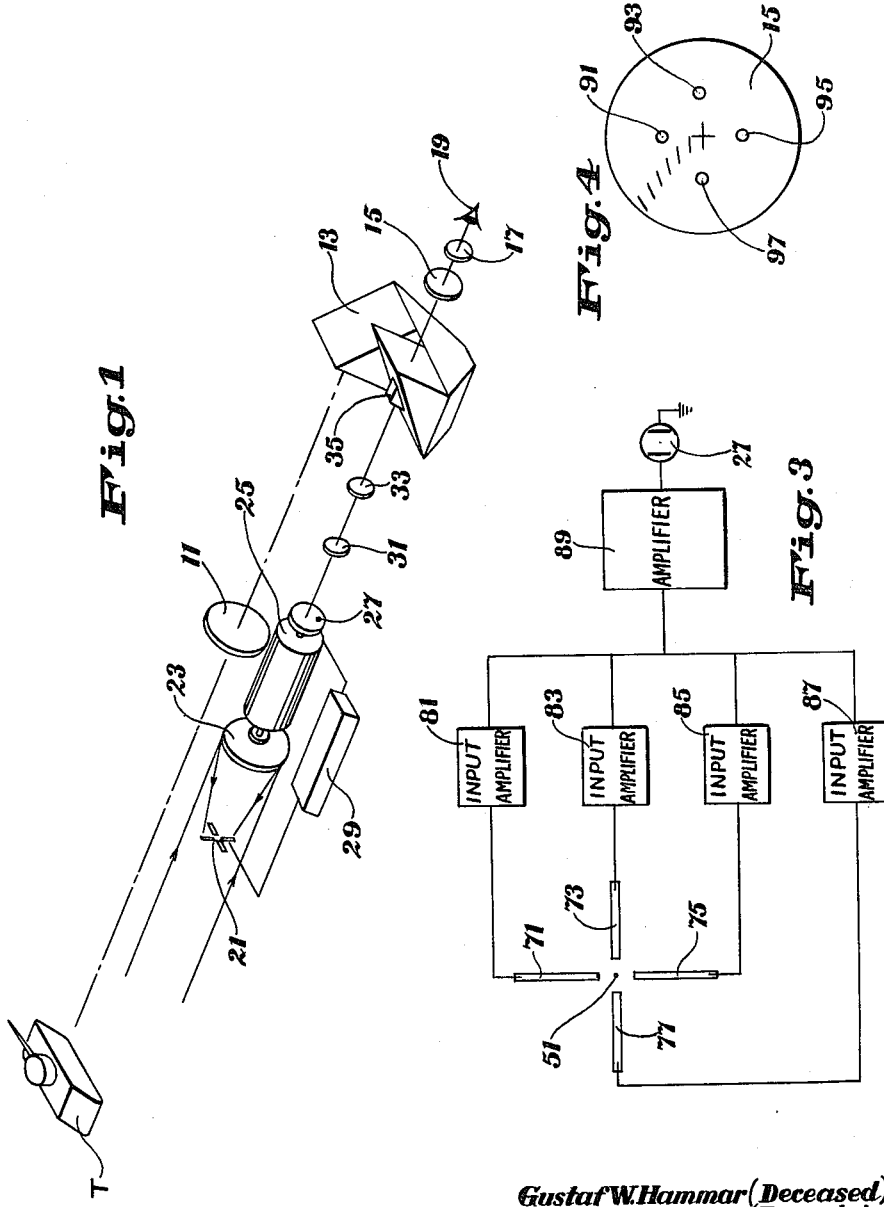
FIG. 1 is a schematic view illustrating the relationship between the essential elements of the telescope and the infrared scanning device of the present invention.

In FIG. 1, T represents a target within the field of the gun sight of the present invention. The gun sight includes a sighting telescope including an objective 11, a prism erecting system 13, and a dual presentation eyepiece comprising field lens 15 and eye lens 17 through which the target may be viewed by an operator as represented by the eye 19. The exact structure of the telescope and the elements thereof is in accordance with principles well known in the art and does not in itself form a part of the present invention. The infrared detecting apparatus of the present invention comprises a cruciform detector 21 supported in the image plane of the infrared scanning mirror 23. The scanning mirror 23 is rotated about an axis offset with respect to the geometric axis thereof, by means of the electric motor 25 which also rotates a neon lamp 27 on the other end of the arbor thereof. The signals produced by the detector 21 are amplified by the amplifier 29 and applied to the neon lamp 27 to energize the same. Light from the lamp 27 is directed through the collimator 31, refocusing lens 33, prism window and beam splitter 35, and through the field lens 15 and eye lens 17 to be viewed simultaneously with and superimposed on the image of the field seen by the telescope.

Figure 2:
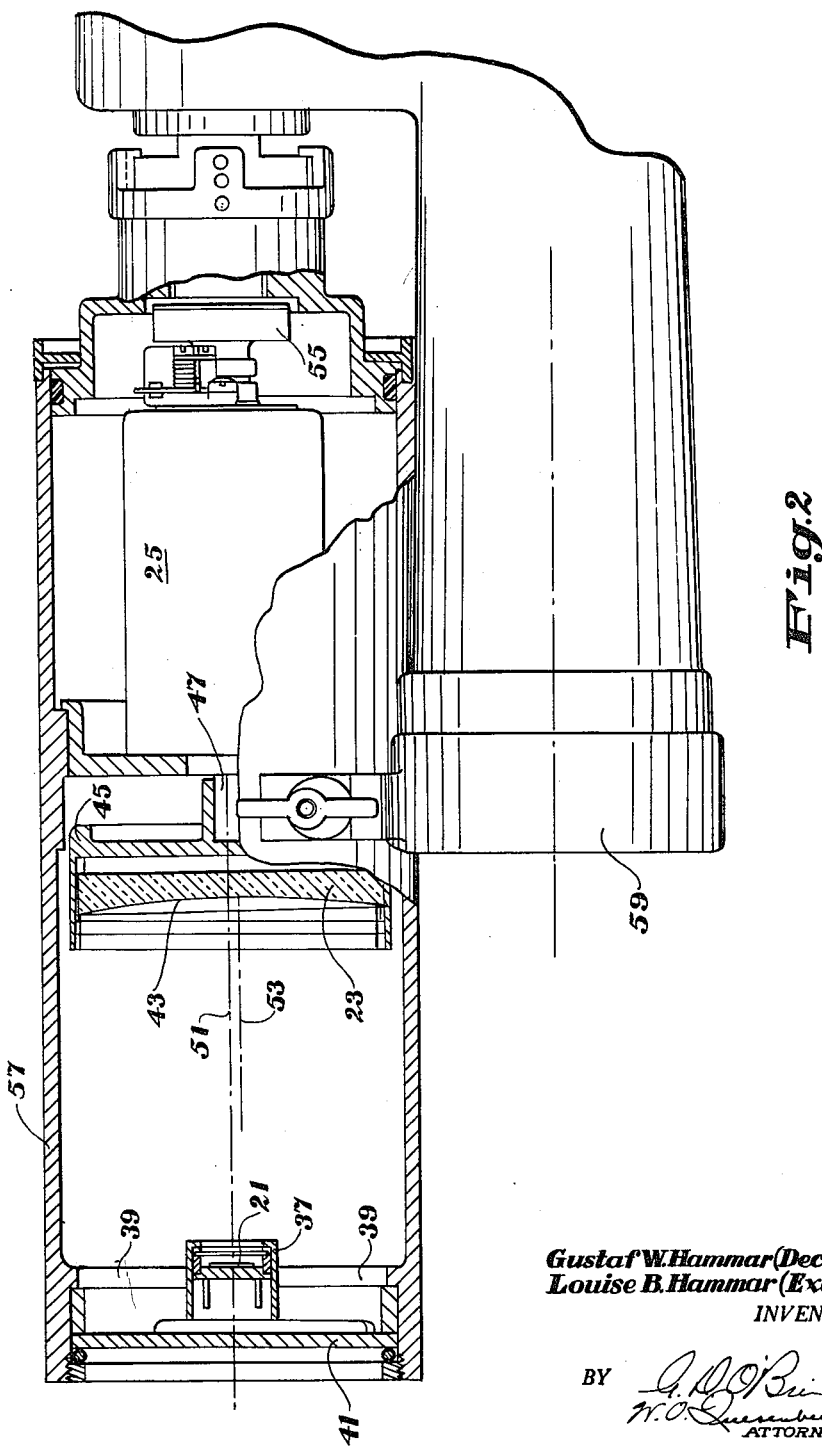
FIG. 2 is an elevation view partly in section illustrating the infrared detecting apparatus and the associated optical scanning system utilized in the present invention.

The arrangement of elements forming the infrared detecting device and optical scanner will be better understood from reference to FIG. 2. The cruciform detector 21 is positioned in the image plane of the concave mirror 23 and is mounted within the housing 37 which is supported on suitable spokes 39. Infrared energy from the target T passes through the thin fused quartz window 41 and is reflected from the aspherical front surface 43 of mirror 23 which is carried within a mount 45. Mount 45 is fixed to the arbor 47 extending from one end of the motor 25. As was mentioned above, the mirror 23 revolves around an axis of rotation 51 which coincides with the axis of the arbor 47 and which is displaced from and parallel to the geometric axis 53 of the mirror 23. Mirror 23 is thus able to scan a predetermined field and to reflect the infrared energy from any target within the field onto the detector 21. A small housing 55 is carried on the other end of arbor 47 and is rotated simultaneously and in synchronism with the mirror 23. Housing 55 contains the neon lamp 27 which is preferably a NE-2 tube which fires on 85–90 volts D.C. and extinguishes at 65–70 volts D.C. Casing 57 encloses the detector 21, mirror 23, and motor 25 and serves to protect the elements from stray infrared radiation as well as moisture and dust present in the atmosphere. The casing 59 encloses the optical system forming the telescope schematically illustrated in FIG. 1 as well as the collimator 31 and refocusing lens 33 of the detecting apparatus. As indicated in both FIG. 1 and FIG. 2, the telescope is mounted in parallel alignment with the detecting apparatus and as close thereto as possible in order to reduce parallax and alignment discrepancies therebetween.

The arrangement of the elements of the cruciform detector 21, the amplifier 29 and the neon lamp 27 is further illustrated in FIG. 3. The cruciform detector utilized in the present invention is formed of four distinct elements 71, 73, 75 and 77 which are mounted in diametrically opposed horizontal and vertical relation with respect to a point lying on the axis of rotation 51. The signals produced by the elements 71, 73, 75 and 77 in response to the presence of infrared energy thereon are amplified by input amplifiers 81, 83, 85 and 87 respectively and are further amplified by the triggering amplifier 89 from which the signals are applied to the lamp 27 to energize the same.

The operation of the gun sight of the present invention is as follows:

The image of a target T within a predetermined field of the telescope is seen through the field lens 15 and eye lens 17 by the operator's eye 19. In order to determine the range and exact position of the target T the operator adjusts the position of the telescope to thereby position the image of the target nearer the center of the eyepiece 15. As the alignment of the telescope and target T is brought about, the scanning mirror 23 of the infrared detecting system focuses infrared energy from the target into the image plane in which the detector 21 is supported. When the target T is not in exact alignment with the gun sight, the infrared energy from the target will not fall on each of the detecting elements 71, 73, 75 and 77 but instead will be cyclically focused upon only one (or more) of the elements such as, for example, element 77. Signals produced by the element 77 in response to the presence of the infrared energy are amplified and applied to the lamp 27 which is energized in response thereto. Because mirror 23 is cyclically scanning the field, the signals from the element 77 are in the form of a pulse and consequently the lamp 27 is energized for only a short period of time and will occupy a position during that time corresponding to the position of element 77. Thus the operator will see the target and a single light signal as at 97 in the left part of the field of the field lens 15 (see FIG. 4). As the target and the gun sight become more nearly aligned, other elements of the cruciform detector 21 will also receive focused infrared energy from the target T and the lamp 27 will be also energized in those positions corresponding to the positions of the other elements. For example, when the image of the infrared energy from target T falls on element 71 the lamp 27 will be energized in a position corresponding to the position of element 71 as at 91. When the focused infrared energy from target T falls on the element 73 the lamp 27 is energized in the corresponding position as at 93, and when the infrared energy is present on the element 75 the lamp 27 is enegized as at the position 95. When the target T and the infrared detecting apparatus are in exact alignment the infrared energy from the target will be focused on each element of the detector 21 in sequence and the lamp 27 is energized at all of the positions 91, 93, 95 and 97 during each complete cycle of rotation. In other words, the on-target point of aim is established when the flashing lamp 27 shows a full pattern of four dots as the infrared image of the target sweeps over the ends of the four detector elements. When a pattern of four light signals corresponding in position to that shown at 91, 93, 95 and 97 is seen on the field lens 15, the target T will be visible through the telescope, provided sufficient light is available, and will appear on the presentation eyepiece exactly centered with respect thereto.

It will be readily appreciated by those skilled in the art that the gun sight can be utilized to determine the point of aim either as a purely visual sight, that is, utilizing the telescope only, as a scanner utilizing the natural or passive heat radiation of a target, or utilizing both the telescope and the infrared detection apparatus simultaneously.

While only one embodiment of the present invention has been illustrated and specifically described, many modifications and variations are possible and will become readily apparent to those skilled in the art from the foregoing description which is intended, therefore, to be illustrative only and the scope of the invention is defined in the appended claim.

Having now particularly described the invention what is desired to be secured by Letters Patent of the United States and what is claimed is:

The combination with a telescope having an image plane and a presenting eyepiece, of an infrared detecting apparatus comprising an optical system including a concave mirror for focusing into a given plane the infrared energy from a target located within a predetermined field, said mirror being mounted for rotation about an axis displaced from and parallel to the geometric axis thereof, means for rotating said mirror to cyclically scan said field, an infrared sensitive detecting device supported in said given plane to receive said infrared energy, said device including a plurality of distinct elements uniformly distributed about a point lying on said rotational axis, means for amplifying the signals produced by each element of said detecting device in response to the presence of said infrared energy thereon, a visible light source spaced from and mounted for rotation about said rotation axis, means for rotating said light source in synchronism with the rotation of said mirror, means for applying said amplified signals to said light source to energize said light source, and means for focusing the light from said light source onto said image plane whereby a pattern of uniformly distributed visible signals equal in number to the number of said elements appears on said given plane when said detecting apparatus is in optical alignment with said target, said visible signals being visible through said presenting eyepiece superimposed on the image of said target focused onto said image plane by said telescope.

References Cited in the file of this patent

UNITED STATES PATENTS

| | | |
|---|---|---|
| 1,747,664 | Droitcour | Feb. 18, 1930 |
| 2,422,971 | Kell | June 24, 1947 |
| 2,426,184 | Deloraine | Aug. 26, 1947 |
| 2,431,510 | Salinger | Nov. 25, 1947 |
| 2,492,888 | Robbins | Dec. 27, 1949 |
| 2,561,924 | Hellen | July 24, 1951 |